United States Patent [19]
Kirkendall

[11] Patent Number: 6,085,615
[45] Date of Patent: Jul. 11, 2000

[54] BRACKET FOR SOLENOIDS ON VEHICLE TRANSMISSIONS

[75] Inventor: W. Scott Kirkendall, Laurinburg, N.C.

[73] Assignee: Rostra Precision Controls, Inc., Laurinburg, N.C.

[21] Appl. No.: 08/798,088

[22] Filed: Feb. 12, 1997

[51] Int. Cl.$^7$ .................................................. F16H 57/02
[52] U.S. Cl. ........................................................ 74/606 R
[58] Field of Search ........................... 74/606 R; 248/909

[56] References Cited

U.S. PATENT DOCUMENTS

| | | | |
|---|---|---|---|
| 4,842,010 | 6/1989 | Edgecomb et al. | 74/606 R X |
| 5,040,316 | 8/1991 | Fast | 248/909 X |
| 5,148,720 | 9/1992 | Swenson, Sr. et al. | 74/606 R |
| 5,209,444 | 5/1993 | Rinderer | 248/909 X |

*Primary Examiner*—Mary Ann Battista
*Attorney, Agent, or Firm*—MacMillan, Sobanski & Todd, LLC

[57] ABSTRACT

A bracket for connecting a solenoid to a vehicle transmission includes a solenoid of the type that activates a valve for transmission fluid, and the solenoid includes an alignment member. The bracket includes a centerplate on which the solenoid can be mounted. The centerplate has alignment surfaces for receiving the alignment member of the solenoid to align the solenoid with respect to the bracket. An attachment appendage is detachably secured to the bracket, where the attachment appendage has an attachment opening to accommodate a fastener to secure the bracket to the transmission. The attachment appendage can be removed from the centerplate to allow the bracket to fit any one of a group of several vehicle transmissions.

14 Claims, 5 Drawing Sheets

BRACKET FOR SOLENOIDS ON VEHICLE TRANSMISSIONS

TECHNICAL FIELD

This invention relates to brackets for various control parts to be mounted on or applied to vehicle transmissions. More particularly, this invention pertains to brackets suitable for mounting generally standard control parts, such as solenoids, onto any one of a number of vehicle transmissions having generally different configurations.

BACKGROUND OF THE INVENTION

Automatic vehicle transmissions are routinely used in automotive and other vehicles to convert the power from an engine output shaft to a drive shaft. In general, the automatic transmission shifts the gear ratios so that the ratio of drive shaft revolutions to the engine revolutions increases at higher vehicle speeds. The automatic transmission typically operates on fluid mechanics, and therefore contains numerous fluid passageways and valves for controlling the flow of transmission fluid. The transmission is enclosed in a transmission case or housing, and has an input end and an output end. The exterior surface of the transmission case generally follows the contour of the transmission components contained within the transmission case. Different transmissions therefore have different outside contours.

The valves are typically mounted in or on a valve body within the transmission case. In order to control the transmission, various control devices must have access to the interior of the transmission or to the valve body. One particular control device is a solenoid which operates valves within the transmission. Frequently there are four or five solenoids placed either inside or on the outside of the transmission case to operate valves inside the transmission, although the number of solenoids can vary from zero to about 10. Generally, the solenoids are mounted on the valve body which is contained within the transmission housing, although sometimes the solenoids are mounted outside the transmission housing. The valve bodies for different transmissions have different configurations. There are one or more orifices through the housing for wiring to the solenoids attached to the valve body.

The solenoids used in the control of automatic transmissions are usually attached to the valve body or transmission housing with a bracket having attachment openings or bolt holes to allow the bracket and solenoid to be bolted to the transmission case or directly to the valve body. This allows the solenoid to have a rather standard or uniform design, and yet still be attached to various transmissions. Since the outside contour of transmission housing or valve body varies among different transmission models, different brackets are used to attach the solenoids to different transmissions. During the original manufacture and assembly of the motor vehicle transmission, the solenoids are attached with a bracket designed specifically for the transmission housing or valve body of the transmission. The original vehicle manufacturer makes sufficient quantities of any given transmission that there is essentially no cost penalty to have a unique solenoid bracket design for each different transmission design.

One of the problems, however, with using specific bracket designs is that that replacement or repair becomes difficult. Sometime during the life of most vehicles the transmission is reconditioned or rebuilt, usually by transmission specialists. Transmission rebuilders are faced with trying to find parts that duplicate the original parts in a wide variety of transmission designs. Suppliers of parts for this type of aftermarket have difficulty in cost-effectively making a relatively small number of parts having a particular design. Therefore, it would be advantageous if the manufacture and installation of aftermarket parts for vehicles could be made more efficiently. In particular, it would be helpful if an improved way of mounting aftermarket solenoids onto automatic transmissions could be developed.

SUMMARY OF THE INVENTION

The above objects as well as other objects not specifically enumerated are achieved by a bracket for connecting a solenoid to a vehicle transmission. The solenoid is the type that activates a valve for transmission fluid, and the solenoid includes an alignment member. The bracket includes a centerplate on which the solenoid can be mounted. The centerplate has alignment surfaces for receiving the alignment member of the solenoid to align the solenoid with respect to the bracket. An attachment appendage is detachably secured to the bracket, where the attachment appendage has an attachment opening to accommodate a fastener to secure the bracket to the transmission. The attachment appendage can be removed from the centerplate to allow the bracket to fit any one of a group of several vehicle transmissions.

In a specific embodiment of the invention, the attachment appendage can be detached from the centerplate with hand tools.

In a particular embodiment of the invention, a score line is provided at the location where the attachment appendage is secured to the bracket, so that the attachment appendage can be detached from the bracket by breaking the attachment appendage off at the score line.

DETAILED DESCRIPTION AND PREFERRED EMBODIMENTS OF THE INVENTION

Figure 1:
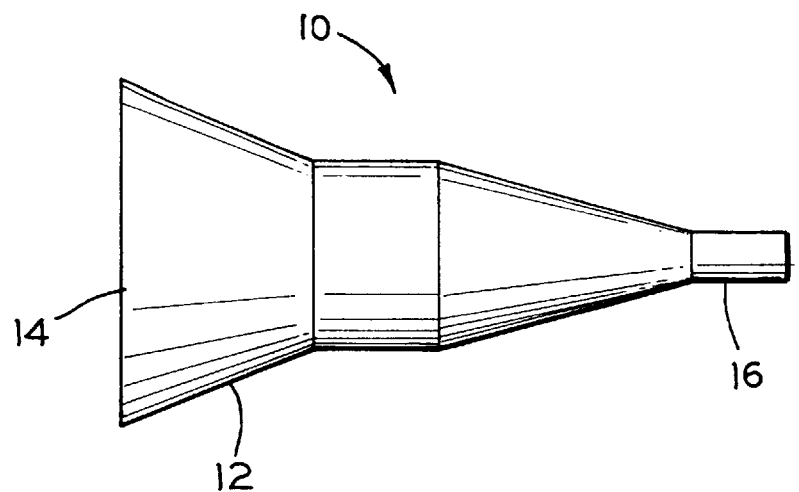
FIG. 1 is a schematic view in elevation of an automatic transmission on which the bracket of the invention is to be used.

As shown in FIG. 1, the transmission is indicated at 10, and is enclosed in transmission case or housing 12. The input end 14 of the transmission receives output from the vehicle engine, not shown, and after the appropriate gear reductions, the transmission delivers an output torque from output end 16 of the transmission.

Figure 2:
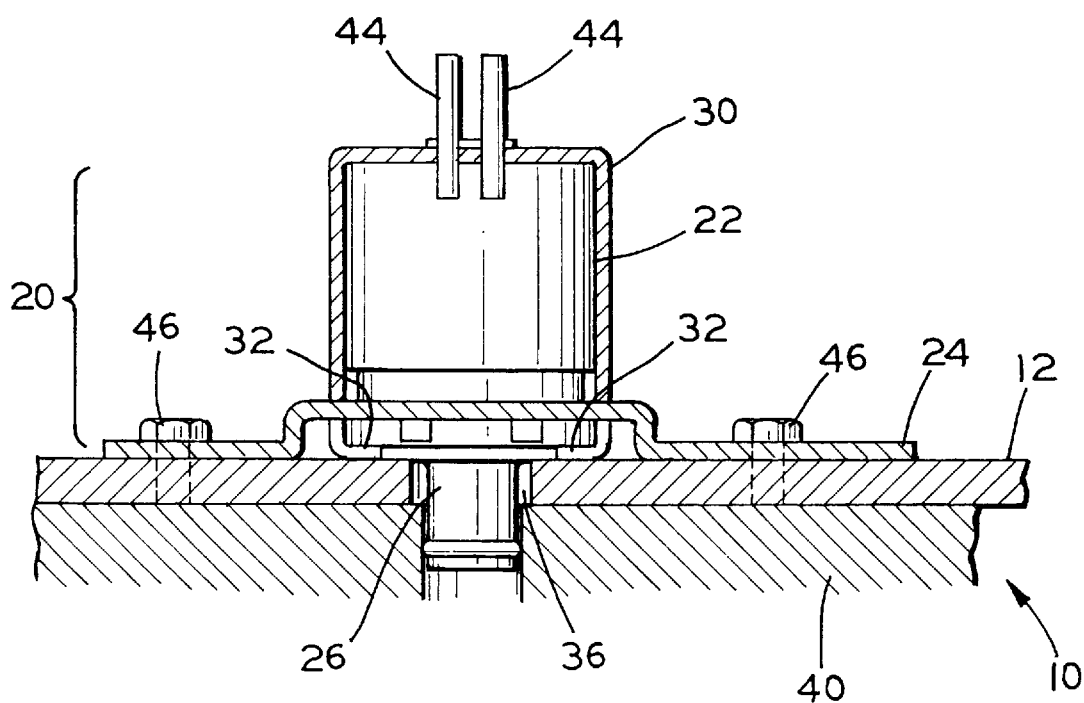
FIG. 2 is a schematic cross-sectional view in elevation of the solenoid assembly of the invention mounted on the automatic transmission.

As shown in FIG. 2, the solenoid assembly 20 is mounted on the housing 12 of the transmission 10. Although the solenoid assembly 20 is shown as being mounted on the transmission housing, it is to be understood that the solenoid can be mounted directly on the valve body, as will be explained below. The solenoid assembly generally includes a solenoid 22, a bracket 24 for mounting the solenoid on the transmission housing, and a port 26 to be inserted into the transmission. The solenoid assembly is held together by the clamping action of the frame 30, which holds onto the port 26 and thereby retains the bracket 24 which is sandwiched between the port and the solenoid. The frame has legs 32 which are bent or crimped around the corners of the port when the solenoid assembly is put together. The port 26 extends through an opening 36 in the housing 12, to connect to the valve body 40. The solenoid has two electrical leads 44 that connect the solenoid to a control panel, not shown, or other control device. The operation of a solenoid to control the valves in a transmission as described so far is considered to be well known to those skilled in the art.

Figures 3, 3A:
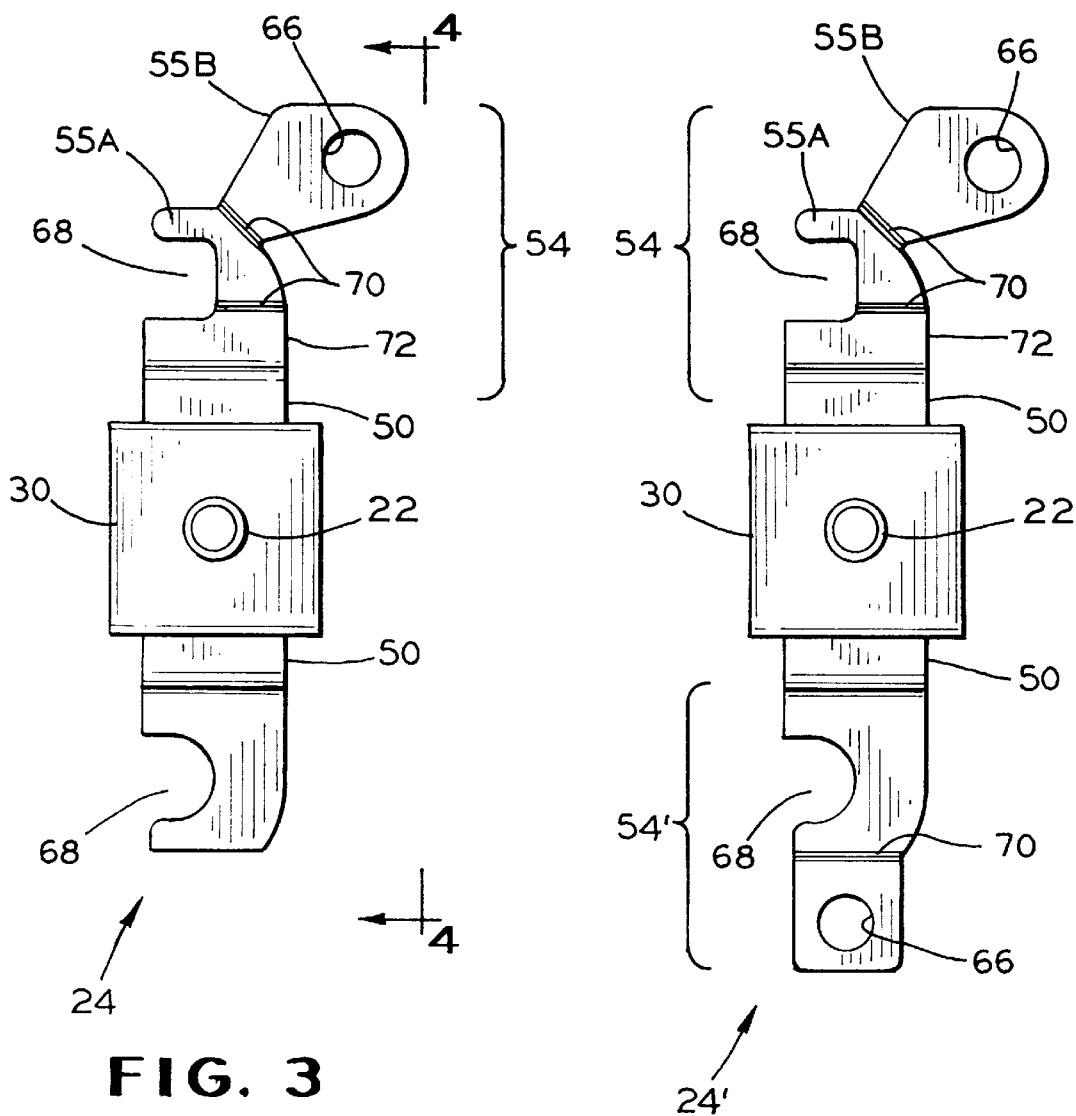
FIG. 3 is a schematic plan view of the solenoid and bracket of FIG. 2.
FIG. 3A is a schematic plan view of an alternative embodiment of the solenoid and bracket of FIG. 2.
Figure 4:
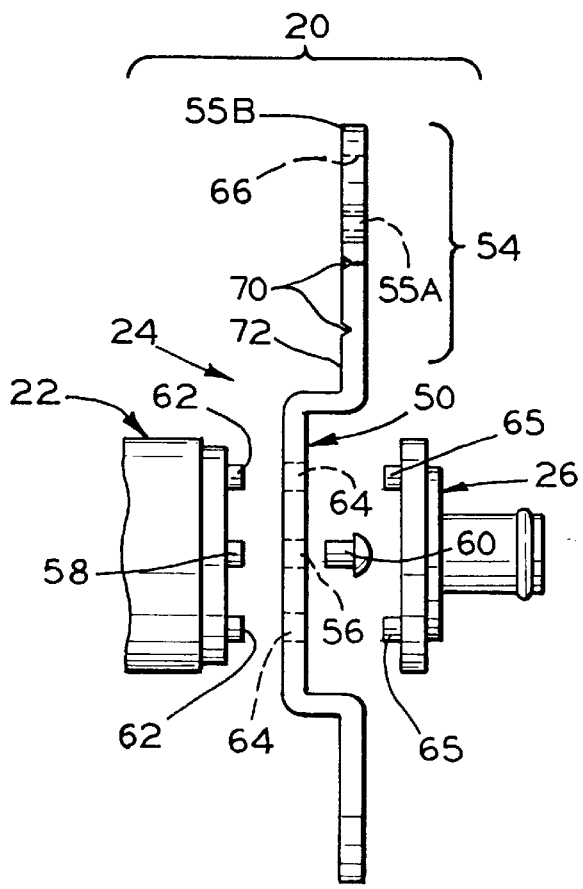
FIG. 4 is an exploded view of the solenoid and bracket taken along line 4—4 of FIG. 3.

As shown in FIGS. 2–4, the bracket 24 is the element enabling the solenoid assembly 20 to be mounted onto the housing 12. The bracket 24 can be attached to the housing by any suitable fastener. Preferably the bracket is fastened by bolts 46 that are threadably secured into the housing or the valve body. The bracket can be considered to have two major elements. The first is the centerplate 50 on which the solenoid 22 is mounted. The second element is one or more attachment appendages 54 which are detachably secured to the bracket 24.

The centerplate 50 is provided with a plunger orifice 56 to receive the plunger 58 which is part of the solenoid 22. The plunger, when activated, forces the poppet 60 to move into closer contact with the port, thereby closing off the path of transmission fluid flowing through the port. This provides the function of a valve for the flow of the transmission fluid through the port. Therefore, the centerplate plunger orifice 56 allows communication from the solenoid to the port 26 via the poppet 60.

In order to provide assured alignment of the solenoid with the centerplate 50 and with the transmission housing opening 36, the solenoid is provided with one or more alignment members which mate with or are confined by alignment surfaces. The alignment members can be any element on the solenoid that helps align the solenoid with the bracket. Likewise, the alignment surfaces can be any element on the bracket centerplate that provides alignment with the solenoid alignment members. Preferred alignment members are alignment posts 62, as shown in FIG. 4. Preferred alignment surfaces are the alignment orifices 64 in the centerplate. The alignment posts fit inside the alignment orifices to assure that the solenoid will be positively fixed with respect to the bracket. Also, it is preferred that the port be provided with port alignment posts 65 that are lined up with the alignment orifices 64 to maintain the port in proper alignment.

One or more attachment appendages, indicated generally at 54, are attached to the bracket centerplate 24. The attachment appendages 54 are detachably secured to the bracket 50 so that they can be removed or detached if necessary to provide a good fit between the bracket 24 and the housing 12 or the valve body 40. The attachment appendages can be connected to the centerplate or any other part of the bracket in any suitable manner as long as they are readily detachable. For example, the attachment appendages could be cemented to the bracket, as long as the bond could be readily broken as necessary. The attachment appendages can be divided into a main body portion 55A and an extension portion 55B, which depends from main body portion 55A, as show in FIG. 3. If necessary, either the extension portion or both the extension portion 55B or both the main body portion 55A and the extension portion 55B can be broken off to provide a good fit with the transmission housing or the valve body.

The attachment appendages have attachment openings for receiving fasteners, such as the bolts 46, so that the bracket can be securely mounted on the transmission housing 12 or on the valve body 40. The attachment openings can be any opening suitable for accommodating a fastener. A preferred attachment opening is attachment orifice 66. An alternate attachment opening is an open slot 68, which may be crescent shaped. The open slot 68 allows a certain amount of looseness or "play" in aligning the bolt with the bracket to accommodate slight misalignment of the bolts and to accommodate situations where various parts are worn or bent. It can be seen that any number of attachment appendages can be removed as long as at least one attachment orifice 66 or open slot 68 remains. With at least one attachment orifice 66 or open slot 68 remaining, the bracket 24 will be effective to handle its function of connecting the solenoid to the vehicle transmission.

FIG. 3A illustrates an alternative embodiment of the solenoid 22 and bracket 24' illustrated in FIG. 2. The alternative bracket 24' includes both a first attachment appendage 54 and a second attachment appendage 54' extending from the centerplate 50. The second attachment appendage 54' has first and second attachment openings 68 and 66 formed therethrough, and a score line 70 is formed therein that extends between the first and second attachment openings 68 and 66.

Figure 6:
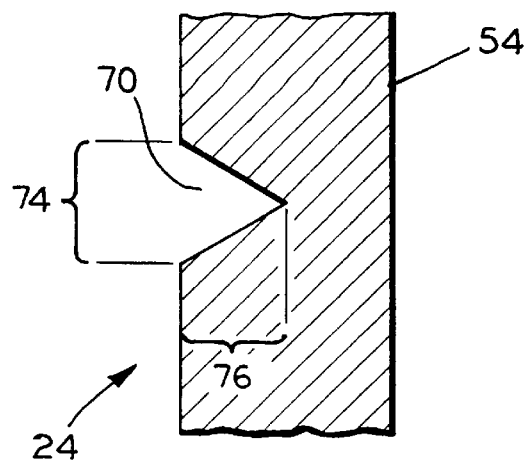
FIG. 6 is a detailed view in elevation of a score line on the bracket of FIG. 5.

A preferred method of detachably securing the attachment appendages is to provide a thinner area or score line 70 in the location 72 of the bracket where the attachment appendages are secured to the bracket 24. The score line enables the attachment appendages to be removed with hand tools, such as, for example, a pair of common pliers. By bending an attachment appendage back and forth a few times, it can be broken off. FIG. 6 illustrates the details of a preferred score line. The bracket is preferably a low carbon cold rolled steel having good magnetic properties, and a thickness of about 0.075 to about 0.085 inch (0.19 to 0.22mm). The width 74 of the score line 70 is preferably about 0.03 inches (0.076 mm) and the depth 76 is also preferably about 0.03 inches (0.076 mm).

Figure 5:
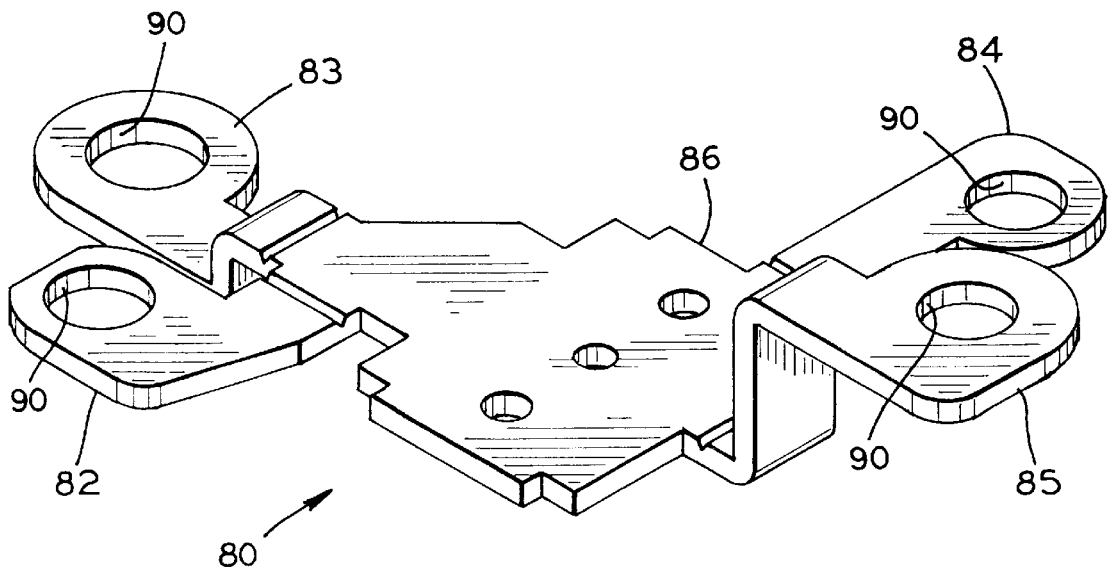
FIG. 5 is a schematic view in perspective of an alternate embodiment of a bracket according to the invention.

As shown in FIG. 5, in an alternative embodiment of the invention, the attachment bracket 80 includes four attachment appendages 82, 83, 84 and 85, all detachably secured to the center plate 86. Each attachment bracket is secured to the center plate by means of a score line 88, enabling any one of the four attachment appendages to be broken off using hand tools. Each of the appendages has an attachment orifice 90 for securing the bracket (and the solenoid) to the transmission. As illustrated, two of the appendages 82 and 84 are in the plane of the centerplate 86, and two of the appendages 83 and 85 are offset from the plane of the centerplate. This gives more flexibility in attaching the bracket 80 to various automatic transmissions. It can be seen that the bracket 24 in FIG. 4 also has its attachment appendages 54 offset from the plane of the centerplate 50.

Figure 7:
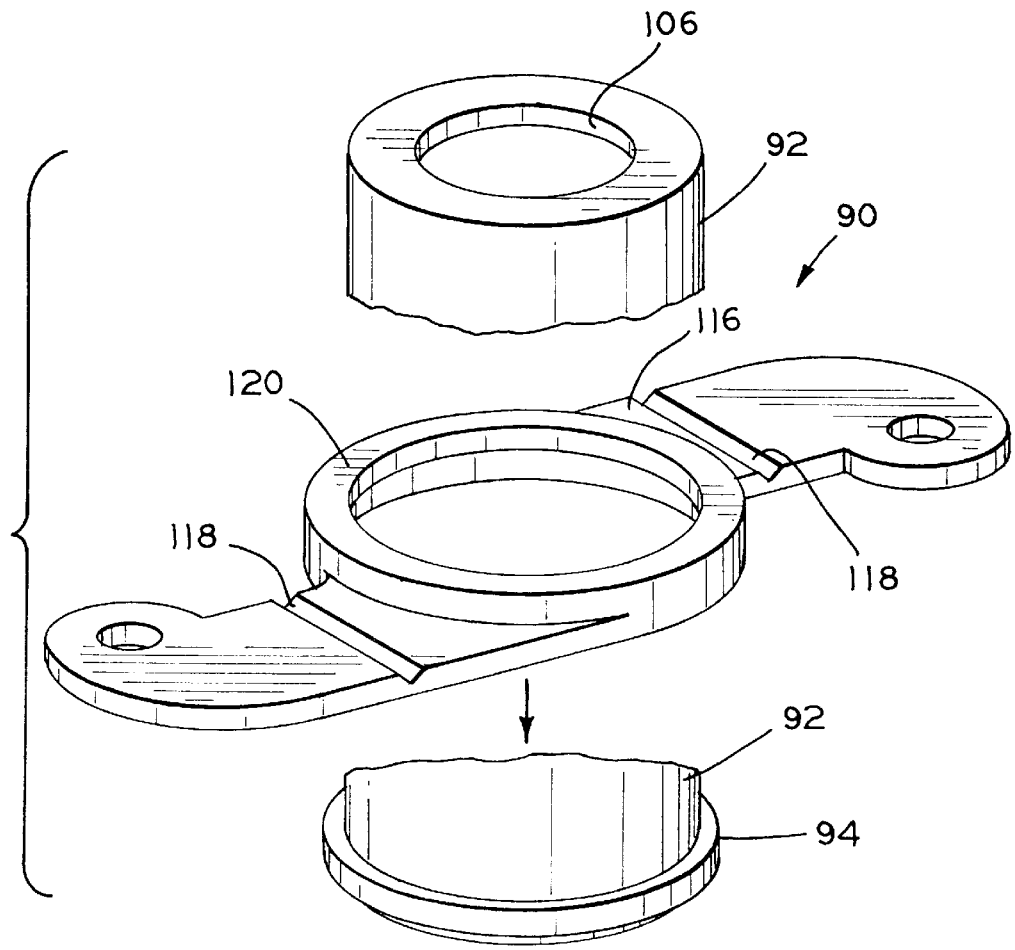
FIG. 7 is a schematic perspective view of a bracket of the invention for a generally cylindrical solenoid, with the bracket and solenoid attached directly to the valve body.
Figure 8:
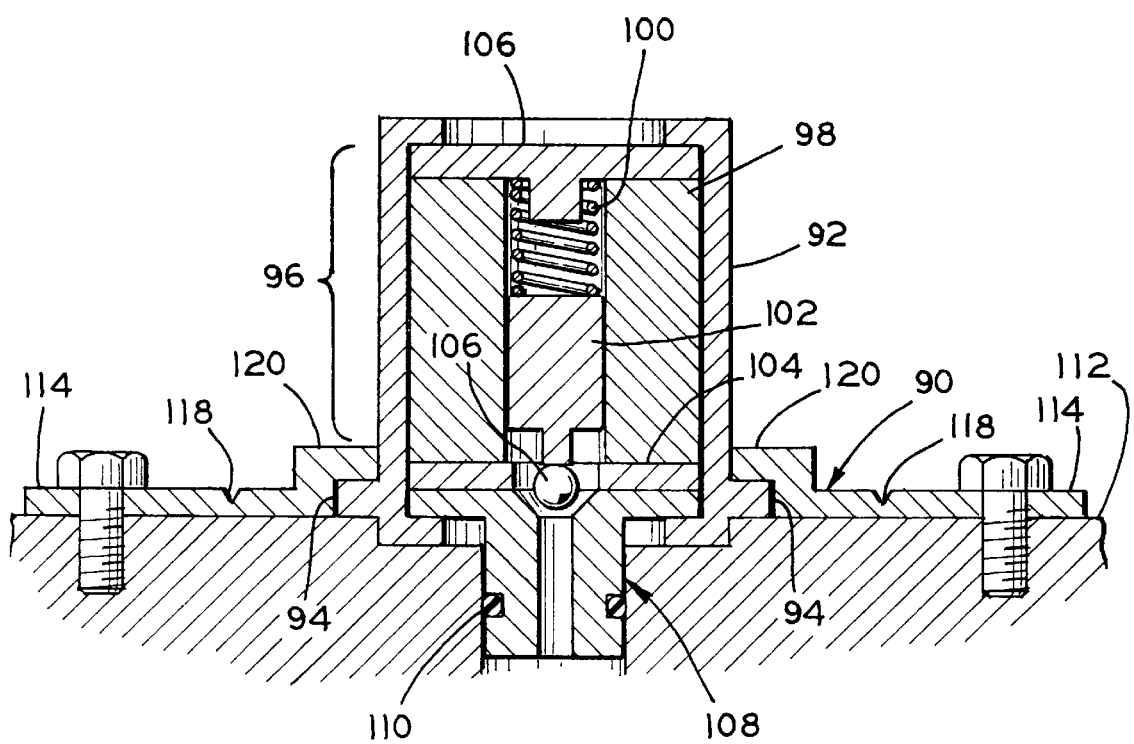
FIG. 8 is a cross-sectional view in elevation of the bracket of FIG. 7, in combination with a solenoid.

As shown in FIGS. 7 and 8, the solenoid and attachment bracket can be attached directly to the valve body. Attachment bracket 90 is designed to slide over the top of the cylindrically shaped solenoid frame 92 and clamp on the annular alignment flange 94 of the solenoid frame. The solenoid 96 includes coil 98, spring 100, plunger 102, pole face 104, core 106 and ball seal 106, which are all commonly known solenoid elements. The operation of the solenoid 96 includes cooperation between the electrically energizable coil 98 and the spring 100 to move the plunger 102 toward the port. This forces the ball seal 106 into contact with the port 108 to close the port valve. The port 108 includes O-ring 110 for a sealed connection with the valve body 112. The attachment bracket 90 has attachment appendages 114 detachably secured to the bracket center plate 116, and score lines 118 enable the attachment appendages 114 to be detached if necessary for a good fit with the valve body 112. The alignment flange 94 at the bottom of the solenoid frame 92 acts as an alignment member, and the annular collar 120 on the bracket centerplate 116 provides an alignment surface to align the solenoid 96 with respect to the bracket 90.

The principle and mode of operation of this invention have been described in its preferred embodiment. However, it should be noted that this invention may be practiced otherwise than as specifically illustrated and described without departing from its scope.

What is claimed is:

1. A solenoid assembly that is adapted for use with a variety of vehicular transmissions having differing configurations of attachment openings provided thereon, said solenoid assembly comprising:

a bracket including a centerplate having an attachment appendage extending therefrom, said attachment appendage including first and second portions having first and second attachment openings respectively formed therethrough, said attachment appendage further having a score line formed therein that extends between said first and second portions such that said second portion can be detached from said first portion; and a solenoid mounted on said centerplate of said bracket.

2. The solenoid assembly defined in claim 1 wherein at least one of said first and second attachment openings is an orifice.

3. The solenoid assembly defined in claim 1 wherein at least one of said first and second attachment openings is a slot.

4. The solenoid assembly defined in claim 1 wherein at least one of said first and second attachment openings is an orifice and at least one of said first and second attachment openings is a slot.

5. The solenoid assembly defined in claim 1 wherein said score line is a first score line, and wherein said attachment appendage further has a second score line formed therein that extends between said centerplate and said first attachment opening.

6. The solenoid assembly defined in claim 1 wherein said attachment appendage is a first attachment appendage, and wherein said bracket further includes a second attachment appendage extending from said centerplate, said second attachment appendage having first and second attachment openings formed therethrough, said second attachment appendage further having a score line formed therein that extends between said first attachment opening and said second attachment opening.

7. A solenoid assembly that is adapted for use with a variety of vehicular transmissions having differing configurations of attachment openings provided thereon, said solenoid assembly comprising:

a bracket including a centerplate having first and second attachment appendages extending therefrom, said first attachment appendage having a first attachment opening formed therethrough and a score line formed therein that extends between said centerplate and said first attachment opening, said second attachment appendage having a second attachment opening formed therethrough and a score line formed therein that extends between said centerplate and said second attachment opening; and a solenoid mounted on said centerplate of said bracket.

8. The solenoid assembly defined in claim 7 wherein at least one of said first and second attachment openings is an orifice.

9. The solenoid assembly defined in claim 7 wherein at least one of said first and second attachment openings is an open slot.

10. The solenoid assembly defined in claim 7 wherein at least one of said first and second attachment openings is an orifice and at least one of said first and second attachment openings is an open slot.

11. The solenoid assembly defined in claim 7 wherein said first attachment appendage has a plurality of said first attachment openings formed therethrough.

12. The solenoid assembly defined in claim 11 wherein said first attachment appendage has a score line formed therein that extends between each of said first attachment openings.

13. The solenoid assembly defined in claim 11 wherein said second attachment appendage has a plurality of said second attachment openings formed therethrough.

14. The solenoid assembly defined in claim 13 wherein said second attachment appendage has a score line formed therein that extends between each of said second attachment openings.

* * * * *